Figure 1:
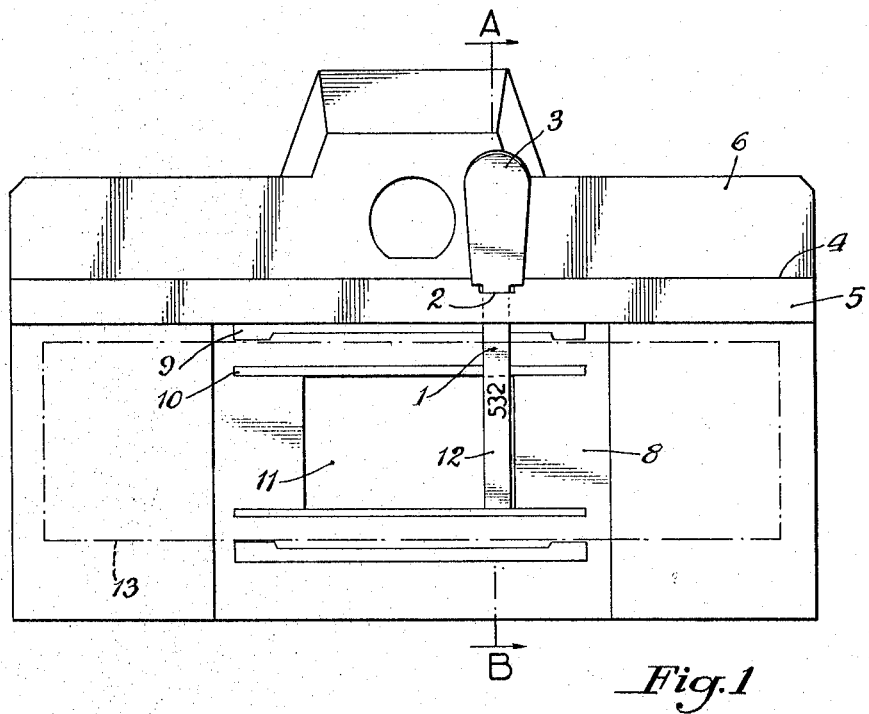

3,266,394
PHOTOGRAPHIC CAMERA WITH LABELING MEANS USING BAND SHAPED TRANSPARENT CHARACTER CARRIERS
Edgar Sauer, Stuttgart-Rohr, Willi Günther, Stuttgart-Mohringen, and Werner Zink, Aich, Kreis Nurtingen, Germany, assignors to Zeiss Ikon Aktiengesellschaft, Stuttgart, Germany
Filed Nov. 20, 1963, Ser. No. 324,965
Claims priority, application Germany, Nov. 21, 1962, Z 9,776
1 Claim. (Cl. 95—1.1)

For photographic cameras labeling means have been suggested in which a band shaped transparent character carrier of plastic material, such as Celluloid, is insertable through a slot in the camera in the vicinity of the picture gate and in front of the layer to be exposed. The character image of an inserted character carrier (numerals, dates, or other indications) is thereby included in the exposure and shows up on a marginal portion of the photograph.

In order to prevent light from entering into the interior of the camera it is known to provide at the slot resiliently yielding sealing means, such as rubber lips, between which the character carrier is inserted. By this means it is feasible to seal off the guide channel for the character carrier in a light-tight manner. However, as experience has shown, this is not sufficient.

It has been found that the transparent character carrier itself, however thin it may be, constitutes a light transmission path and as such may have an unfavorable effect as long as any portion thereof is exposed to light on the outside of the camera which is the case with the projecting portion of the character carrier to be gripped by the operator.

The object of the present invention is to eliminate this disadvantage by providing means which prevent transmission of undesirable light through the character carrier into the dark chamber of the camera in front of the film to be exposed. Said means may take various forms.

Thus, another object of the invention is to provide an opaque sleeve covering at least the portion of the transparent character carrier that projects from the slot in the camera when the character carrier has been inserted.

A further object of the invention is to provide for surface treatment of at least said projecting portion of the character carrier in order to render it opaque as, for example, by application of a coating of black lacquer. Said coating, as well as the sleeve mentioned above, may, of course, extend over the entire character carrier with the exception of the portion to be exposed.

Still another object of the invention is to provide a transparent character carrier of the general kind indicated in which means are provided for weakening the light transmitted there through by reflection on the surfaces of the character carrier to such an extent as to render it harmless. This may be accomplished by making all side and edge surfaces of the character carrier frosted.

A further object of the invention is to provide a transparent character carrier of the general kind indicated in which the transparent material is tinted with a light absorbing substance. This type of character carrier has the advantage that it may be stamped or cut from a properly tinted sheet of material without requiring any post-treatment.

Figure 2:
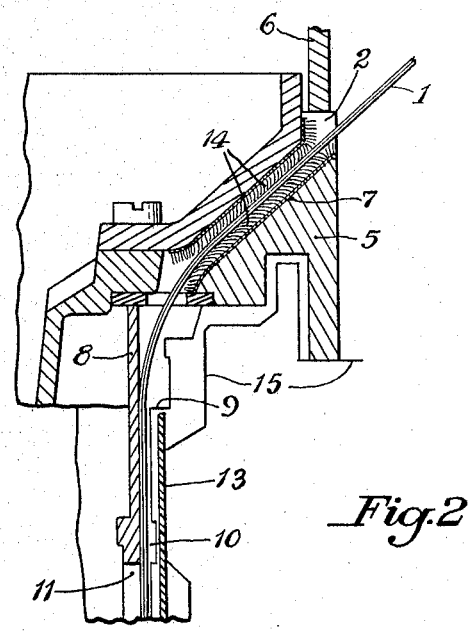

An embodiment of the invention is described in detail below with reference to the accompanying drawing, in which:

FIG. 1 shows a rear view of a miniature camera provided with the labeling means according to the invention and having the rear cover removed, and FIG. 2 shows a section on line A–B of FIG. 1 on an enlarged scale.

In the embodiment shown, a band-shaped character carrier 1 is made of transparent material, such as celluloid, and tinted in accordance with the invention. It is resiliently flexible but sufficiently rigid to permit of being inserted through a slot 2 in the camera. An enlargement 3 at the end of the band 1 serves to be gripped by the operator and may also serve to limit the extent to which the character carrier can be inserted in the slot by abutment against the edge of the camera slot 2, as indicated in FIG. 1. The slot 2 is disposed in the rear wall of the camera and is shown in the drawing as located at the junction 4 between the camera body 5 and the top cover 6.

From the slot 2 an inclined guide channel 7 extends to the rear wall 8 of the camera body 5 and further along said rear wall 8 and through recesses in the upper film guide bars 9 and 10 to guide the character carrier 1 to its position across the picture gate 11. This places the exposure area 12 of the character carrier 1 between the film 13 and the picture gate 11 where it extends over a marginal portion of the picture gate 11, as shown in FIG. 1.

In the inclined channel 7 sealing strips 14 are provided which may consist of a fabric of artifical fibers and which seal the channel in a light-tight manner. Accordingly, the inserted band 1 would form the only way by which light could enter the interior of the camera but the band material is tinted so as to render any light entering therethrough harmless. It has been found that a gray tint is sufficient in that it absorbs the entering light to a satisfactory degree and at the same time renders the band material sufficiently transparent to enable exposure light to penetrate the labeled area 12 to expose the labeling (in this case the figures 532) on the film 13.

It is believed that the light absorption in the band material is exponentially dependent upon the length of travel through said material. Thus, if the character carrier 1 has, e.g., a thickness on the order of .01" and due to the tint permits passage of one half of the transverse incident light (transparency value 50%), then only about .000001 of the incident light goes through a distance on the order of .16" in the longitudinal direction.

It may, however, be assumed that in practice a weakening of the light to .0001 will be sufficient which means that on the aforementioned short length of .16" a transparency value of up to 60% would be satisfactory and on a length of .4" even up to 80%. With a character carrier of the above mentioned thickness a transparency value of as little as 30% would produce a satisfactory labeling of the photograph, so that a transparency range of 30% to 80% would be satisfactory under the stated circumstances.

In the camera shown in the drawing, light through the character carrier should obviously be absorbed within the range of the sealing means 14 and it is generally readily feasible to make this range extend over .16" to .4", or even more. Generally speaking, therefore, the sealing length and the transparency of the character carrier must be adapted to each other. The longer the sealing length is, the higher the transparency can be.

The rear closure of the camera can be provided in any known manner as, for example, by means of a film holder indicated by the contour 15 in FIG. 2.

What we claim is:

In combination a photographic camera including an upper rear casing portion and a vertical wall spaced inwardly from said portion, said upper casing portion having an obliquely extending light tight slot directed inwardly and downwardly from the rear casing portion to the vertical wall, a lining on the inner surface of said light tight slot, and a transparent band-shaped character carrier strip formed of plastic material for insertion in said slot from the rear of said camera, said strip being tinted grey to permit 30% to 80% light transmission in a direction normal to its plane so that image light rays will pass through all portions not covered by said character thereon, said oblique slot being adapted to guide said strip inwardly and downwardly for a portion of its length and then vertically and downwardly in front of said rear wall in overlying relation with a camera film, said slot being of a length of approximately .16 of an inch to .4 of an inch, and said strip being tinted grey such that light transmission longitudinally of said strip along said predetermined distance will be substantially eliminated.

References Cited by the Examiner

UNITED STATES PATENTS

| | | | |
|---|---|---|---|
| 1,288,221 | 12/1918 | Schmidt | 95—1.1 |
| 1,304,361 | 5/1919 | Oehring | 95—1.1 |
| 1,360,414 | 11/1920 | Kuo | 95—1.1 |
| 1,362,581 | 12/1920 | Schmidt | 95—1.1 |
| 1,473,902 | 11/1923 | Charbeneau | 95—1.1 |

JOHN H. HORAN, *Primary Examiner.*